Oct. 20, 1925.
R. A. MUELLER
PLUNGER
Filed Oct. 16, 1922
1,557,720
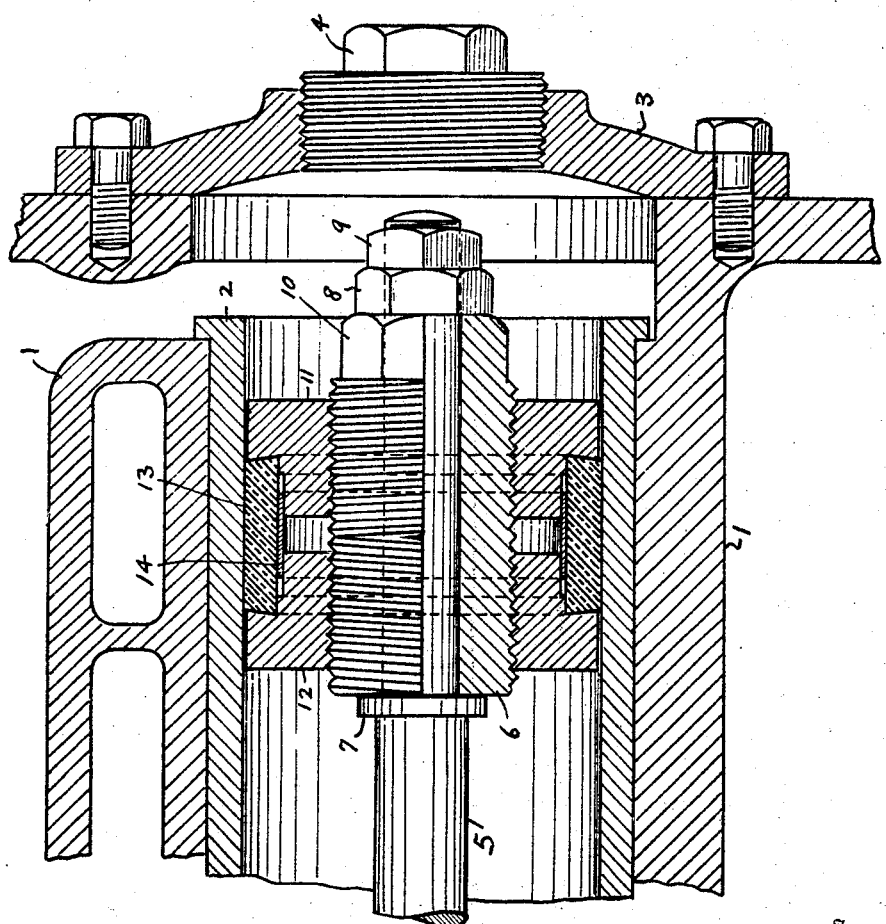
Inventor
Robert A. Mueller
By
Hardway Tatt
Attorneys Patented Oct. 20, 1925.

1,557,720

UNITED STATES PATENT OFFICE.

ROBERT A. MUELLER, OF HOUSTON, TEXAS, ASSIGNOR OF ONE-HALF TO E. J. DRAKE, OF HARRIS COUNTY, TEXAS, AND ONE-HALF TO GRAY TOOL COMPANY, OF HOUSTON, TEXAS, A CORPORATION OF TEXAS.

PLUNGER.

Application filed October 16, 1922. Serial No. 594,736.

*To all whom it may concern:*

Be it known that I, ROBERT A. MUELLER, a citizen of the United States, residing at Houston, in the county of Harris and State of Texas, have invented certain new and useful Improvements in a Plunger, of which the following is a specification.

This invention relates to plungers or pistons adapted to work in a cylinder, and more particularly to plungers adjustable to take up wear.

An object of this invention is to provide a plunger which may be adjusted to fit closely within the cylinder so as to prevent leakage of fluid therearound.

Further objects will appear from the detail description taken in connection with the accompanying drawing, which represents a longitudinal section of a pump cylinder containing a plunger embodying this invention.

Referring to the drawing, 1 designates the pump cylinder having a lining 2 and a head 3 provided with a removable plug 4.

The numeral 5 designates a plunger rod on one end of which there is fitted the sleeve 6. One end of this sleeve abuts against the collar or washer 7 on the sleeve and abutting against the other end of the sleeve there is a nut 8 which is threaded onto the end of the rod 5 and which is held against detachment by the lock nut 9. The end of the sleeve adjacent the nut 8 is formed polygonal as at 10 to receive a socket wrench. The sleeve is externally threaded, having a right handed thread at one end and a left handed thread at the other, and threaded onto these respective sections of the sleeve are the metallic plunger sections 11 and 12 whose facing sides are shouldered down forming a slightly dove-tailed annular groove in which fits the packing ring 13 of rubber or similar material. Within this ring there is a thin metallic band 14 which closes the joint between the plunger sections and forms an internal reinforcement for the packing element 13.

When the plunger becomes worn by use so as not to fit closely within the cylinder, the plug 4 may be removed and a socket wrench fitted over the end 10 of the sleeve and said sleeve turned so as to force the sections 11 and 12 together. During this operation said sections will ordinarily be held against turning by the friction of the plunger with the cylinder walls, this friction increasing as the packing is compressed. As the sections 11 and 12 are forced together the packing element 13 will be forced outwardly so as to contact closely against the walls of the cylinder to prevent leakage.

If the friction is not sufficient to hold the plunger sections against turning while turning the sleeve 6, independent means may be used to hold the section 11 stationary while turning said sleeve until the friction against the cylinder walls becomes sufficient to hold the plunger against turning.

The plunger is thus provided with sections movable toward and from each other having packing therebetween. The adjusting sleeve centrally connects the sections for relative movement by turning the sleeve, whereby expansion of the packing is effected to insure close contact with the cylinder walls. The sleeve is formed for manipulation from the cylinder head so that it is only necessary to remove the plug in order to render the sleeve accessible for adjustment. Thus the necessity for dismantling the pump in order to adjust the piston is obviated.

It is obvious that various changes may be made in details of construction without departing from the spirit of this invention; it is, therefore, to be understood that this invention is not to be limited to the specific details shown and described.

Having thus described the invention, what is claimed is:

1. A plunger including a sleeve having oppositely threaded sections, plunger sections threaded into the respective sleeve sections, and an annular packing element clamped between said plunger sections.

2. A plunger including a sleeve having oppositely threaded sections, plunger sections threaded onto the respective sleeve sections, an annular packing element clamped between said plunger sections, and a metallic ring fitted within said packing element and breaking the joint between the plunger sections.

3. A plunger including a sleeve, plunger sections threaded onto the sleeve by means of right and left hand threads respectively, the facing sides of said sections being shouldered down to form an annular groove, a metallic ring in said groove arranged to break the joint between said sections and a packing element fitted in said groove around said ring and clamped between said sections.

4. In combination a pump body having a cylinder therein, a head forming a part of said body, a removable plug in said head aligned with said cylinder, a plunger in said cylinder, said plunger including a sleeve formed with right and left hand threads, plunger sections threaded onto said respective threads, and a packing element clamped between said plunger sections, one end of said sleeve being polygonal in form.

5. A plunger comprising, a pair of sections adapted to receive packing therebetween, and an adjusting element operatively connected with said sections and formed for manipulation from the head end of the plunger, adapted to move said sections towards and from each other.

6. A plunger comprising, a pair of sections adapted to receive packing therebetween, and an adjusting element constructed and arranged to centrally connect said sections for simultaneous relative movement in order to effect expansion of the packing.

7. A plunger comprising, a pair of sections adapted to receive packing therebetween, and an adjusting element constructed and arranged to centrally connect said sections for simultaneous relative movement in order to effect expansion of the packing, said element being formed for manipulation from the head end of the plunger.

8. The combination with a rod, of a plunger comprising a pair of sections adapted to receive a packing therebetween, and an adjusting element on said rod and operatively connected with said sections for simultaneous relative movement thereof in order to effect expansion of the packing.

9. The combination with a rod, of a plunger comprising a pair of sections adapted to receive a packing therebetween, and an adjusting element on said rod and operatively connected with said sections for simultaneous relative movement thereof, said element being formed for manipulation from the head end of said plunger in order to effect expansion of the packing.

In testimony whereof I have signed my name to this specification.

ROBERT A. MUELLER.